(12) United States Patent
Katsuyama et al.

(10) Patent No.: US 6,208,800 B1
(45) Date of Patent: Mar. 27, 2001

(54) RECORDING APPARATUS, RECORDING SYSTEM, AND RECORDING METHOD

(75) Inventors: Akira Katsuyama, Kanagawa; Yoshiaki Takenaka, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/038,166

(22) Filed: Mar. 11, 1998

(30) Foreign Application Priority Data

Mar. 19, 1997 (JP) .................................................... 9-066535

(51) Int. Cl.[7] .......................... H04N 5/761; H04N 5/7617
(52) U.S. Cl. .................................................. 386/83; 386/97
(58) Field of Search .................................. 386/83, 46, 92, 386/96, 97, 104, 54, 39; 348/7, 10, 5; 360/32, 27, 69; H04N 5/761, 5/7617

(56) References Cited

U.S. PATENT DOCUMENTS

| 4,879,611 | * | 11/1989 | Fukui et al. ............................ 386/83 |
| 5,541,738 | * | 7/1996 | Mankovitz ............................... 386/83 |
| 5,977,964 | * | 11/1999 | Williams et al. ....................... 386/83 |

* cited by examiner

*Primary Examiner*—Robert Chevalier
(74) *Attorney, Agent, or Firm*—Ronald P. Kananen; Rader, Fishman & Grauer

(57) ABSTRACT

The invention relates to a video tape recorder (VTR). According to the invention, in a VTR in which the recording of a predetermined program is reserved by setting a recording start time and a recording end time and setting an audio mode of a signal of a program whose recording is reserved, there is provided a VTR which can certainly record a whole program whose recording is reserved even in the case where a broadcasting time of the recording reservation program is deviated back because of an extension of a previous program or the like.

24 Claims, 12 Drawing Sheets

RECORDING APPARATUS, RECORDING SYSTEM, AND RECORDING METHOD

BACKGROUND OF THE INVENTION

1. Field of the Invention

The invention relates to a recording apparatus, a recording system, and a recording method which can automatically perform a recording process by presetting a recording start time and a recording end time and reserving the recording and is suitable when it is applied to, for example, a video tape recorder having a timer recording function.

2. Description of the Related Art

Most of conventional video tape recorders (VTRs) have a timer recording function. In the VTR having the timer recording function, a recording day, a recording start time, a recording end time, a reception channel, and the like are previously inputted and a timer recording is set. In the VTR having the timer recording function, when the timer recording is set, the VTR is set to a mode for automatically recording a program of the preset channel at the recording start time of the timer recording day and the received program is automatically recorded. When the VTR reaches the recording end time, the recording is automatically finished.

When the user sets a recording reservation for a timer recording into the VTR, it is usually necessary to set a recording start time and a recording end time in accordance with a broadcasting start time and a broadcasting end time of a program whose recording is reserved.

In the conventional VTR having the timer recording function, the set contents of the recording reservation such as recording start time, recording end time, and the like which were once inputted are not updated unless otherwise the user manually changes them. Therefore, when a broadcasting of a program such as a baseball relay or the like is extended, a broadcasting time, namely, a start time and an end time of a program to be broadcasted after the extended program is deviated back, so that the VTR cannot perfectly record the target program at the recording start time and recording end time which were set at the time of a recording reservation. Particularly, the problem that the latter half portion of the target program is not recorded.

OBJECTS AND SUMMARY OF THE INVENTION

It is, therefore, an object of the invention to provide a recording apparatus, a recording system, and a recording method which can perfectly record a program whose recording is reserved even in the case where the broadcasting time of a program whose recording is reserved is delayed back because a broadcasting of a previous program is extended or the like.

To accomplish the above object, according to one aspect of the invention, there is provided a recording apparatus comprising: an input setting unit in which a recording start time and a recording end time are set and an audio mode of a signal of a program whose recording is reserved is set; a recording unit for recording an input signal which is received from the source side to a recording medium; an audio mode detecting unit for detecting an audio mode of the received input signal; a counting unit for counting a time while setting the recording start time to a reference; and a recording time updating unit for adding a predetermined value to the recording end time in accordance with the time counted by the counting unit.

To accomplish the above object, according to another aspect of the invention, there is provided a recording system comprising: an operating unit in which a recording start time and a recording end time are designated and an audio mode of a signal of a program whose recording is reserved is designated; a recording unit for recording an input signal which is received from the source side to a recording medium; an audio mode detecting unit for detecting an audio mode of the received input signal; a counting unit for counting a time while setting the recording start time to a reference; and a recording time updating unit for adding a predetermined value to the recording end time in accordance with the time counted by the counting unit.

To accomplish the above object, according to still another aspect of the invention, there is provided a recording method comprising: a recording reserving step of designating a recording start time and a recording end time and designating an audio mode of a signal of a program whose recording is reserved; a counting step of counting a time by setting the recording start time to a reference; an audio mode discriminating step of discriminating whether an audio mode of a signal of a program which is received is a first audio mode as an audio mode of the program whose recording is reserved or not; a recording starting step of starting the recording of a program which is received to a recording medium when it is determined in the audio mode discriminating step that the audio mode of a program which is received is the first audio mode; and a recording time updating step of adding a predetermined value to the recording end time in accordance with the time counted by the counting step when the recording is started.

The above and other objects and features of the present invention will become apparent from the following detailed description and the appended claims with reference to the accompanying drawings.

DETAILED DESCRIPTION OF THE PREFERRED EMBODIMENT

An embodiment of the invention will now be described hereinbelow with reference to the drawings.

Figure 1:
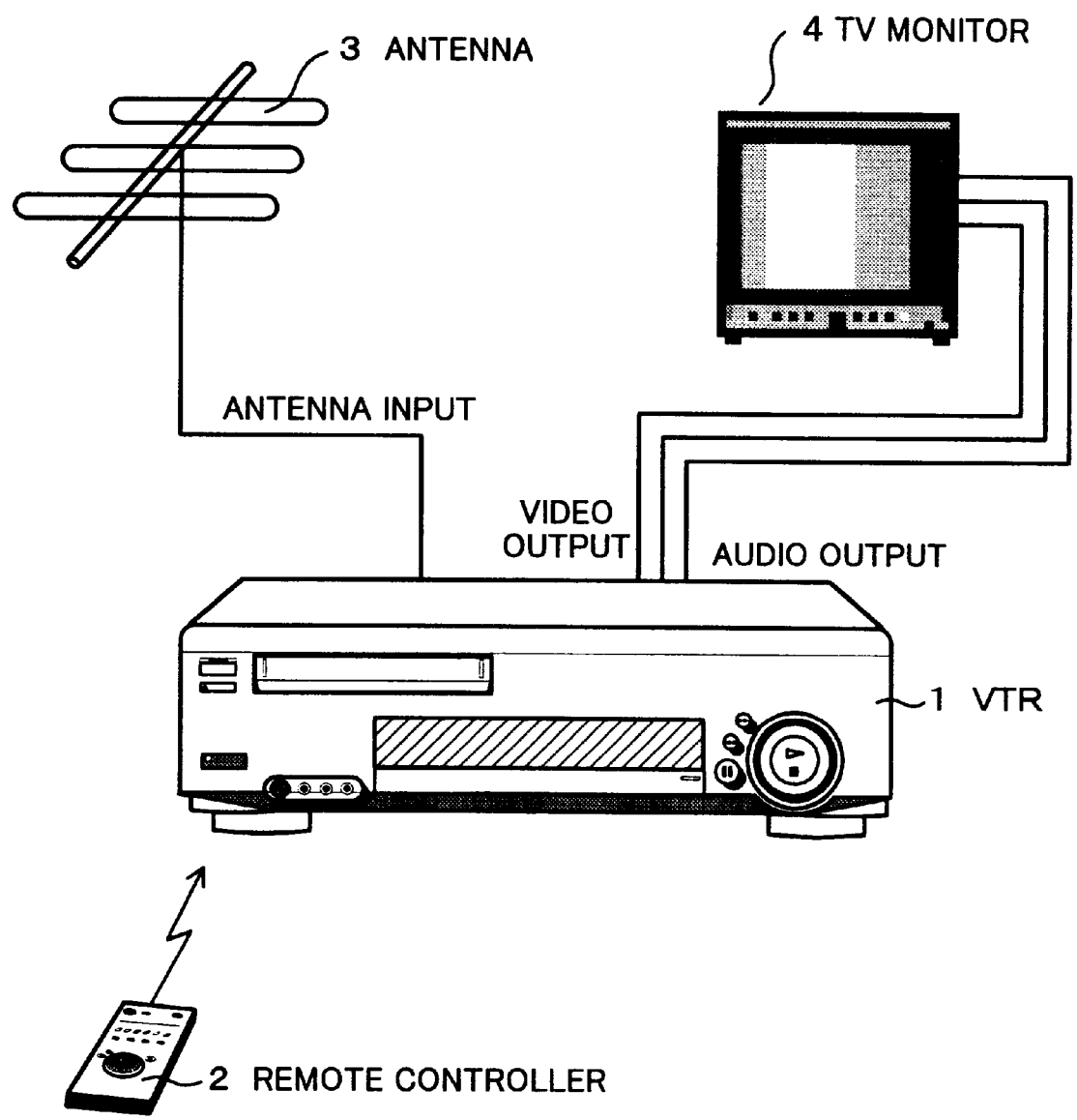
FIG. 1 is a schematic diagram showing a connection example of a VTR according to an embodiment of the invention.

A VTR having a timer recording function according to an embodiment of the invention will now be described with reference to FIGS. 1 and 2. In FIG. 1, reference numeral 1 denotes a VTR (Video Tape Recorder) according to the embodiment and 2 indicates a remote controller serving as operating means which is used for the operation of the VTR 1, setting of a recording reservation of a timer recording, or the like.

A received signal of a broadcasting radio wave received by an external antenna 3 is supplied to an antenna input terminal of the VTR 1. In the VTR 1, the received signal from the antenna 3 is processed and a television broadcasting is recorded or an image is recorded by recording means. An output terminal of the VTR 1 is connected to an input terminal of a television (TV) monitor 4.

Figure 2:
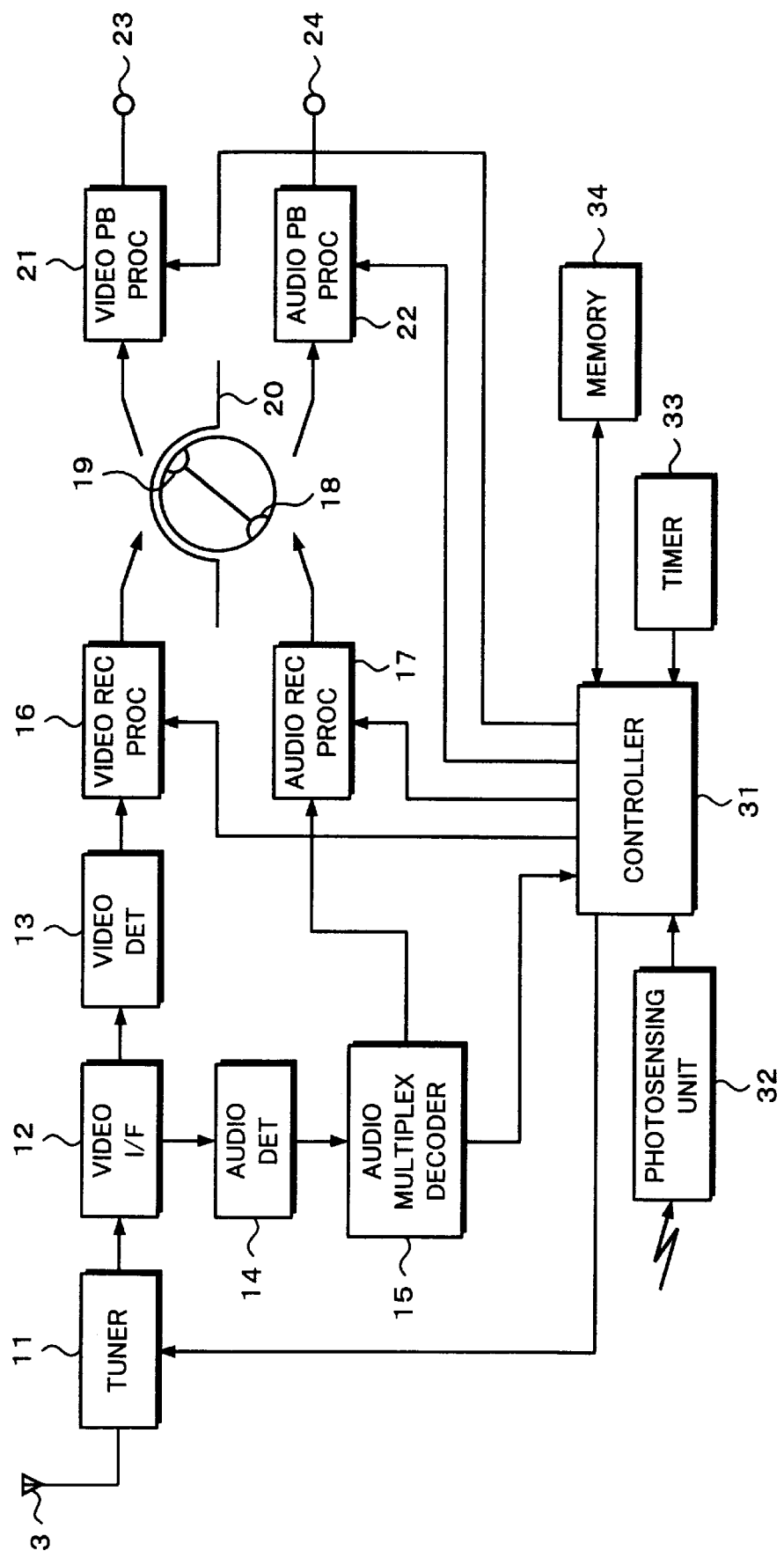
FIG. 2 is a schematic diagram showing a construction example of a VTR according to the embodiment of the invention.

In the VTR 1, as shown in FIG. 2, the received signal from the antenna 3 of a ground wave broadcasting of the VHF band or UHF band is inputted to a tuner 11. In the tuner 11, a signal of a desired channel is selected from the antenna input signal inputted from the external antenna 3 and a video intermediate frequency (IF) signal is formed. The video IF signal is amplified by a video IF amplifying circuit 12. After that, the amplified signal is supplied to a video detecting circuit 13 and an audio detecting circuit 14.

A video signal is detected from the inputted video IF signal by the video detecting circuit 13. In the audio detecting circuit 14, an audio IF signal is extracted from the inputted video IF signal, for example, from a beat component of 4.5 MHz. The audio IF signal is supplied to an audio multiplex decoder 15. An audio signal is demodulated by the audio multiplex decoder 15. In the audio multiplex decoder 15 also serving as audio mode detecting means, an audio mode identification signal which can identify an audio mode of the input signal, namely, a double audio mode, a stereophonic audio mode, and a monaural audio mode is supplied to a controller 31, which will be explained hereinlater.

The video signal outputted from the video detecting circuit 13 is supplied to a video recording processing circuit 16. The audio signal outputted from the audio detecting circuit 14 via the audio multiplex decoder 15 is supplied to an audio recording processing circuit 17. The video recording processing circuit 16 and audio recording processing circuit 17 are used for converting the inputted video signal and audio signal into a recording video signal and a recording audio signal which are suitable for recording, respectively.

In the video recording processing circuit 16, the inputted video signal is separated, namely, Y/C (Y-signal/Chroma signal) separated into a luminance signal and a chroma signal. After that, the luminance signal is frequency modulated to an FM (Frequency Modulation) luminance signal. The chroma signal is frequency converted into a low band chroma signal. The FM luminance signal and the low band chroma signal are frequency division multiplexed and a recording video signal is formed. In the audio recording processing circuit 17, the inputted audio signal is frequency modulated and a recording audio signal is formed. The recording video signal and the recording audio signal are supplied to rotary heads 18 and 19 serving as recording means and recorded onto a video tape 20.

Upon reproduction, the signal recorded on the video tape 20 is reproduced by the rotary heads 18 and 19 and a reproduction video signal and a reproduction audio signal are supplied to a video reproducing processing circuit 21 and an audio reproducing processing circuit 22. In the video reproducing processing circuit 21 and audio reproducing processing circuit 22, signal processes opposite to the signal processes in the video recording processing circuit 16 and audio recording processing circuit 17 are executed, respectively.

In the video reproducing processing circuit 21, the inputted reproduction video signal is separated into an FM luminance signal and a low band chroma signal. The FM luminance signal is frequency demodulated and converted into the original luminance signal. The low band chroma signal is frequency converted into the chroma signal of the original band. The luminance signal and the chroma signal are synthesized and a video signal is formed. In the audio reproducing processing circuit 22, the inputted reproduction audio signal is frequency demodulated and an audio signal is formed.

The video signal outputted from the video reproducing processing circuit 21 and the audio signal which is outputted from the audio reproducing processing circuit 22 are outputted from a video output terminal 23 and an audio output terminal 24, respectively.

The above processes in the VTR 1 are controlled by the controller 31 comprising, for example, a microprocessor. Control signals from the controller 31 are supplied to the tuner 11, video recording processing circuit 16, audio recording processing circuit 17, video reproducing processing circuit 21, and audio reproducing processing circuit 22, so that the station selection of a reception channel, the operation upon recording/reproduction, and the like are controlled. An instruction is supplied to the controller 31 by a remote control or a switching operation. A remote control signal which is supplied from the remote controller 2 as an infrared signal is converted into a predetermined electric signal by a photosensing unit 32. After that, the electric signal is supplied to the controller 31 as necessary.

In the VTR 1, a recording reservation is set by setting means or the like provided for the VTR main body serving as input setting means, so that the timer recording can be performed. The operation at the time of the timer recording is also controlled by the controller 31. In the controller 31, time information, namely, hour/minute/second and year/month/day serving as a foundation of controls of the recording start and recording end at the time of the timer recording are managed. However, a signal serving as a reference of the time information is supplied from a timer circuit 33.

Reference numeral 34 denotes a memory circuit comprising a semiconductor memory or the like. The memory circuit 34 is used to store data of the recording reservation set in the controller 31 or the like. In the VTR 1, the recording reservation for allowing the timer recording to be performed is set by supplying an instruction to the controller 31 by a remote control or a switching operation. The data of the recording reservation set in the controller 31 is written into the memory circuit 34 and stored. The recording reservation data is read out from the memory circuit 34 to the controller 31 as necessary.

In the VTR 1, when the user sets the recording reservation, in a manner similar to the ordinary VTR, the day of the week of the recording, a recording start time, a recording end time, a channel to be recorded, and a recording mode, namely, a normal mode or a 3-times mode are designated. In the VTR 1, further, when the user sets the recording reservation, in addition to the above ordinary designation, an audio mode, namely, a double audio mode, a monaural audio mode, or a stereophonic audio mode of the program whose recording was reserved can be selected.

Figure 3:
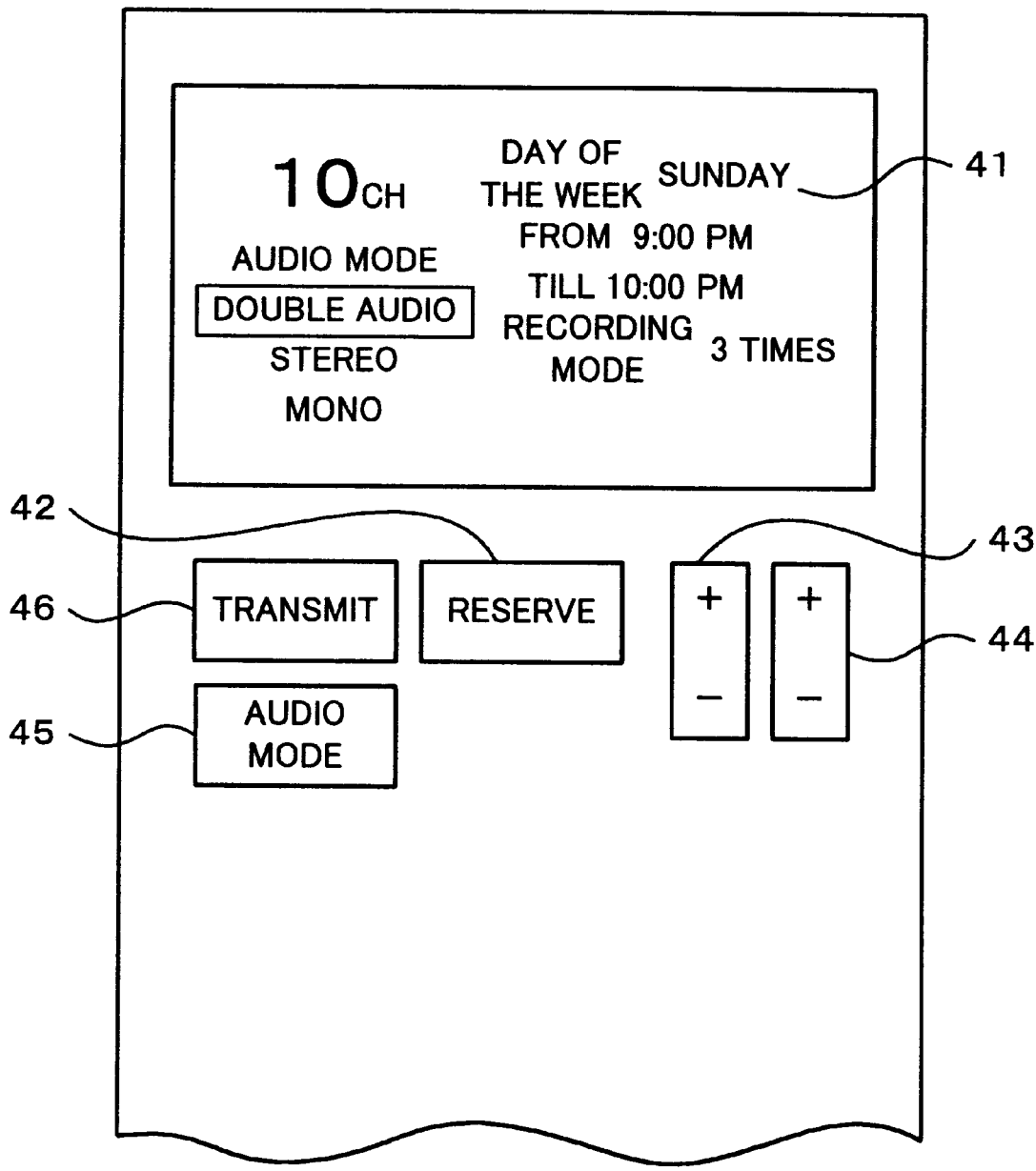
FIG. 3 is a schematic diagram showing a construction example of a remote controller of the VTR according to the embodiment of the invention.

A method of setting the recording reservation using the remote controller 2 serving as operating means will now be described. FIG. 3 is a schematic diagram showing an example of a remote controller which can set the recording reservation. In FIG. 3, reference numeral 41 denotes a display unit on which the set contents of the recording reservation or the like are displayed; reference numeral 42 denotes a reservation key to set the remote controller 2 into a reservation setting mode when it is operated by the user; reference numerals 43 and 44 denote operation keys for the user to input data at the time of the reservation setting; reference numeral 45 denotes an audio mode selection key for the user to select the audio mode of the program whose recording was reserved upon reservation setting; and reference numeral 46 denotes a transmission key. When the transmission key 46 is operated in the remote controller 2 by the user, the data of the set recording reservation is transmitted to the VTR 1.

When setting the recording reservation, the user presses the reservation key 42, operates the predetermined operation keys 43 and 44, designates the day of the week of the recording, recording start time, recording end time, channel, and recording mode, and designates the audio mode of the program whose recording was reserved as necessary. The data of the recording reservation set in the remote controller 2 is transmitted to the VTR 1 and is inputted to the controller 31 when the transmission key 46 is operated. The data of the recording reservation inputted to the controller 31 is stored into the memory circuit 34 in a predetermined format. In the recording reservation setting of the invention, since there is a possibility that the audio mode of the program whose recording was reserved is selected, a monaural broadcasting recording flag fg__mono and a stereophonic broadcasting recording flag fg__ste are set so that the audio mode of the program whose recording was reserved is identified.

Figure 4:
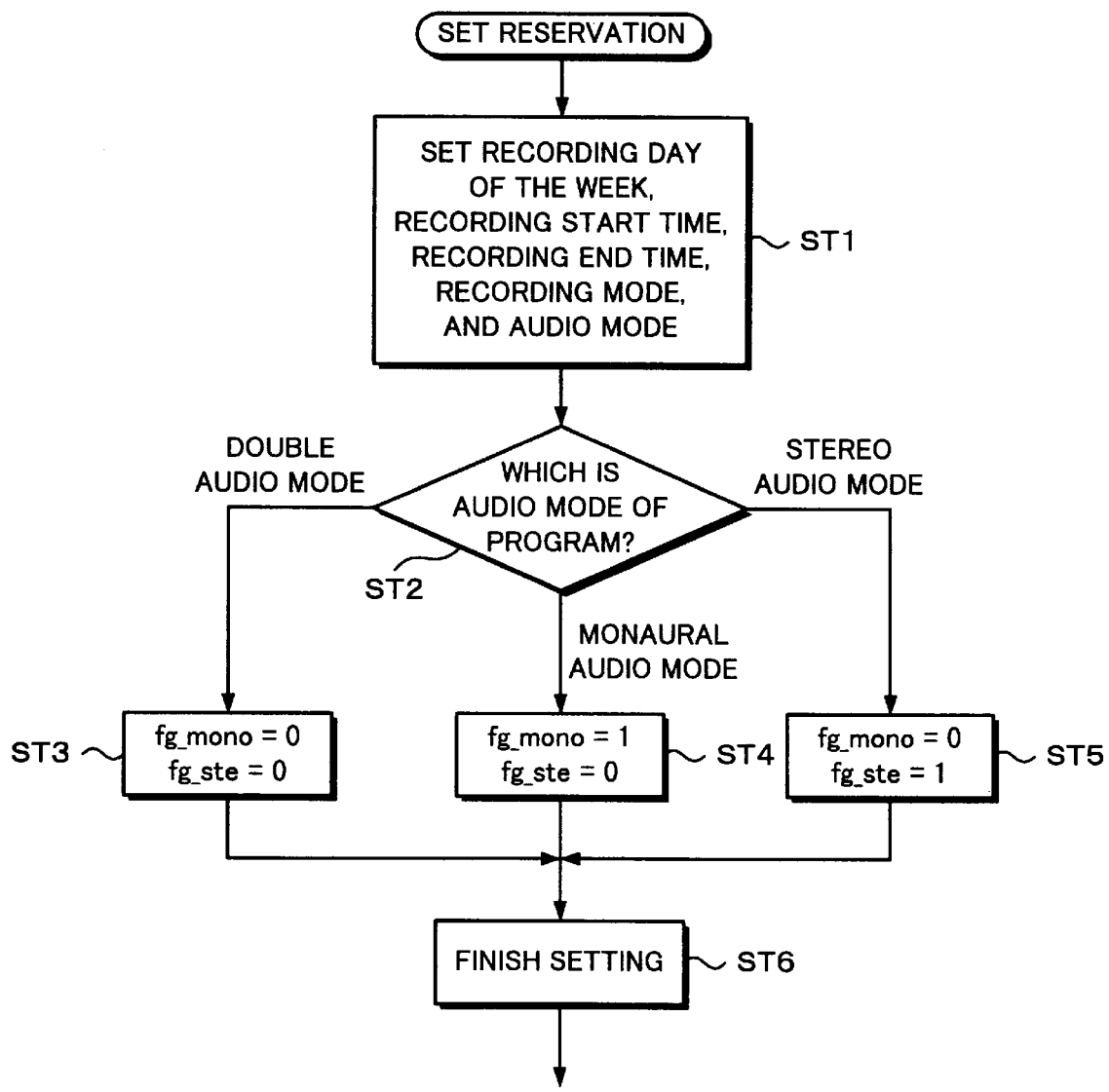
FIG. 4 is a flowchart for explaining a setting procedure of a recording reservation.

When the recording reservation is set, as shown in FIG. 4, the day of the week of the recording, recording start time, recording end time, channel, recording mode, and audio mode are set (step ST1). When the audio mode of the program to be recorded is selected, which audio mode was selected is discriminated (step ST2). When the double audio mode is selected, the monaural broadcasting recording flag fg__mono is set to "0" and the stereo broadcasting recording flag fg__ste is set to "0" (step ST3). When the monaural audio mode is selected, the monaural broadcasting recording flag fg__mono is set to "1" and the stereo broadcasting recording flag fg__ste is set to "0" (step ST4). When the stereophonic audio mode is selected, the monaural broadcasting recording flag fg mono is set to "0" and the stereo broadcasting recording flag fg__ste is set to "1" (step ST5). The setting of the recording reservation is finished (step ST6).

Figure 5:
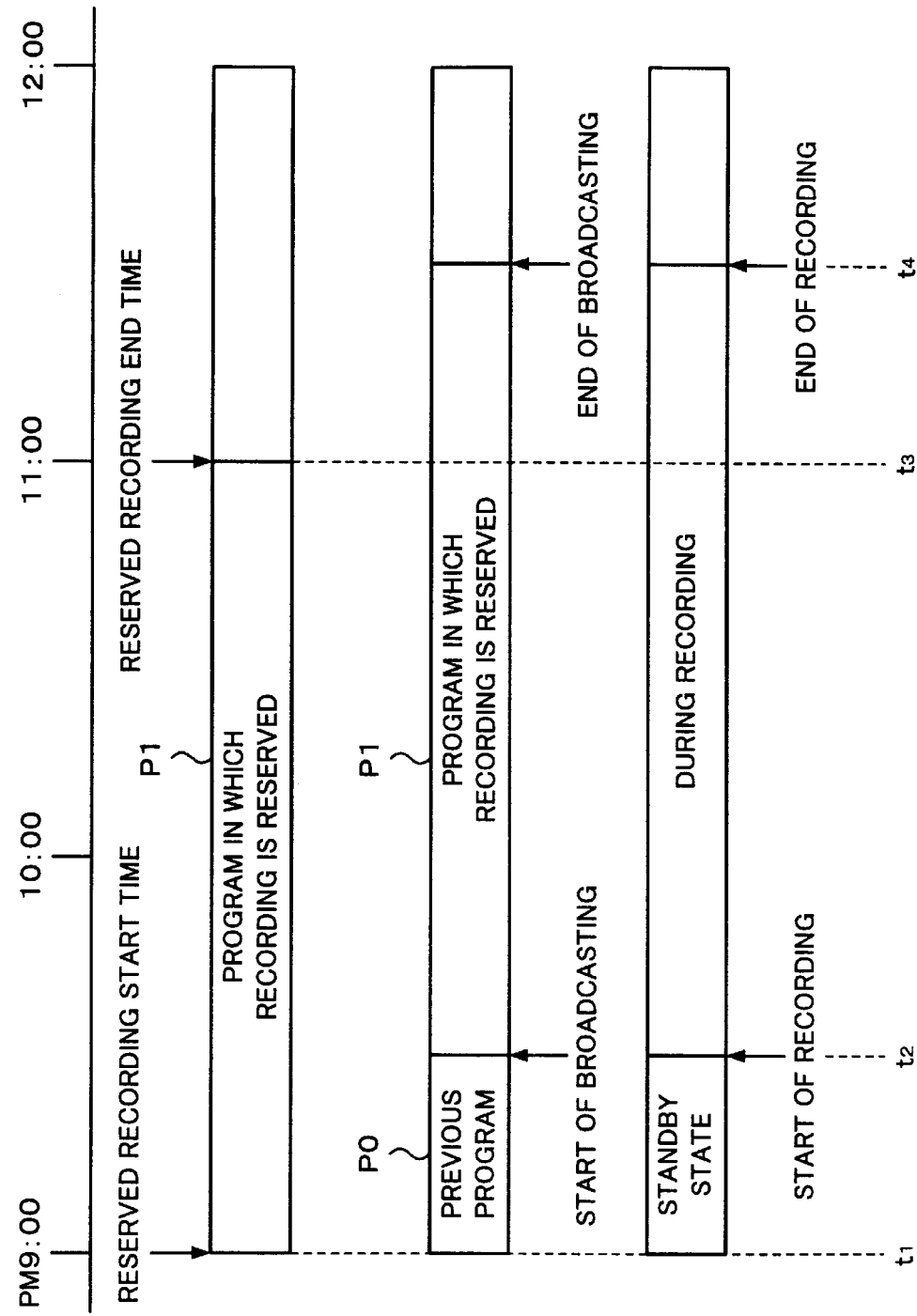
FIG. 5A is a time chart showing a scheduled broadcasting time of a program in which the timer recording is reserved in the VTR according to the embodiment of the invention.
FIG. 5B is a time chart showing a broadcasting time in the case where a program in which the timer recording is reserved in the VTR according to the embodiment of the invention is extended.
FIG. 5C is a time chart for explaining the operation at the time of the timer recording of the VTR according to the embodiment of the invention.

The operation at the time of the timer recording of the VTR 1 will now be described. As shown in FIG. 5A, it is now assumed that the recording of a program P1 in which the broadcasting of the program will be started at time $t_1$ and the broadcasting of the program will be finished at time $t_3$ was reserved. However, as shown in FIG. 5B, it is assumed that a previous program P0 is, for example, a sports relay and a monaural broadcasting and the broadcasting of the previous program P0 was extended and the broadcasting start time and broadcasting end time of the program P1 whose recording had been reserved were deviated back. As shown in FIG. 5B, if the recording start time and recording end time are set in accordance with the initial broadcasting start time $t_1$ and broadcasting end time $t_3$ of the program P1 whose recording is reserved, in the conventional VTR, the previous program P0 is recorded in the head portion of the recording, the portion after the recording end time $t_3$ of the program P1 whose recording is reserved is not recorded, and the program whose recording is reserved is not perfectly recorded. That is, in the VTR 1 of the invention, the audio mode, namely, the double audio mode, monaural audio mode, or stereophonic audio mode of the program whose recording is reserved is previously selected by the user upon setting of the recording reservation. Therefore, while the previous program P0 is being broadcasted, the recording is not started but is in the standby state and the recording can be started simultaneously with the start of the broadcasting of the program P1 whose recording is reserved.

For example, if the program P1 whose recording is reserved is a movie program and is broadcasted by the double audio sounds, the audio mode is set into the double audio mode. If the audio mode is set to the double audio mode, so long as the audio mode of the received broadcasting is not the double audio mode, the recording is not started. As shown in FIG. 5C, when the recording start time comes at time $t_1$, whether the audio mode is the double audio mode or not is discriminated. Since the previous program P0 is the monaural broadcasting and its audio mode is not the double audio mode, even if the recording start time comes at time $t_1$, the recording is not started but is set into the standby state. At time $t_2$ when the broadcasting of the program P1 whose recording is reserved is actually started, it is determined that the audio mode is the double audio mode, and the recording is started.

A difference between the reserved recording start time $t_1$ as a reference and the time $t_2$ when the recording is actually started is counted, the difference is added to the reserved recording end time $t_3$, and recording end time $t_4$ is updated. As shown in FIG. 5C, even if the time of the program P1 whose recording is reserved is updated, the program P1 is certainly recorded.

The above operation will be specifically explained with reference to a flowchart shown in FIG. 6. At the time of the timer recording, the data of the recording start time is referred and a check is made to see if the present time is 30 seconds before the recording start time (step ST11). When the present time reaches 30 seconds before the recording start time, the power source of the VTR 1 is turned on and the VTR 1 is set into the recording standby state (step ST12).

The counting operation of a timer as counting means for counting the time until the recording is started (step ST13). After the power source was turned on, the timer is counted every minute. The timer continues the counting operation until the recording is finished and the power source is turned off. A check is made to see if the audio mode of the reception signal detected by the audio mode detecting means coincides with the set audio mode (hereinafter, referred to as a first audio mode) (step ST14). That is, a process for collating an audio mode identification signal which is supplied from the audio multiplex decoder 15 with the audio mode of the recording reservation program which is set by the monaural broadcasting recording flag fg_mono and stereophonic broadcasting recording flag fg_ste that is set at the time of the recording reservation is executed.

When the audio mode of the reception signal coincides with the set first audio mode, the recording is started (step ST15). The value of the timer at the start of the recording is added to the set recording end time, so that the recording end time is updated by the recording time updating means (step ST16). A check is made to see if the recording end time has come (step ST17). If NO, the processing routine is returned to step ST14.

For a period of time until the recording end time comes, the processes in steps ST14 to ST17 are repeated. When the recording end time comes, the recording is stopped (step ST18) and the power source is turned off (step ST19).

In step ST14, if the audio mode of the reception signal doesn't coincide with the set first audio mode, a check is made to see if the reception signal is a signal in the second audio mode as another audio mode different from the set audio mode (step ST20). If it is determined that the reception signal is not the signal in the second audio mode and when the second audio mode is, for example, the stereophonic audio mode and the recording to be reserved is in the double audio mode, if the previous program in the monaural audio mode is received, the processing routine advances to step ST17.

In step ST20, if the signal in the second audio mode is received, a check is made to see if the signal in the second audio mode has been received for five minutes or more (step ST21). If the signal is not received for five minutes or more, step ST17 follows. If the signal in the second audio mode is received for five minutes or more in step ST21, the recording is stopped and the video tape is rewound (step ST22) and step ST17 follows.

Figure 6:
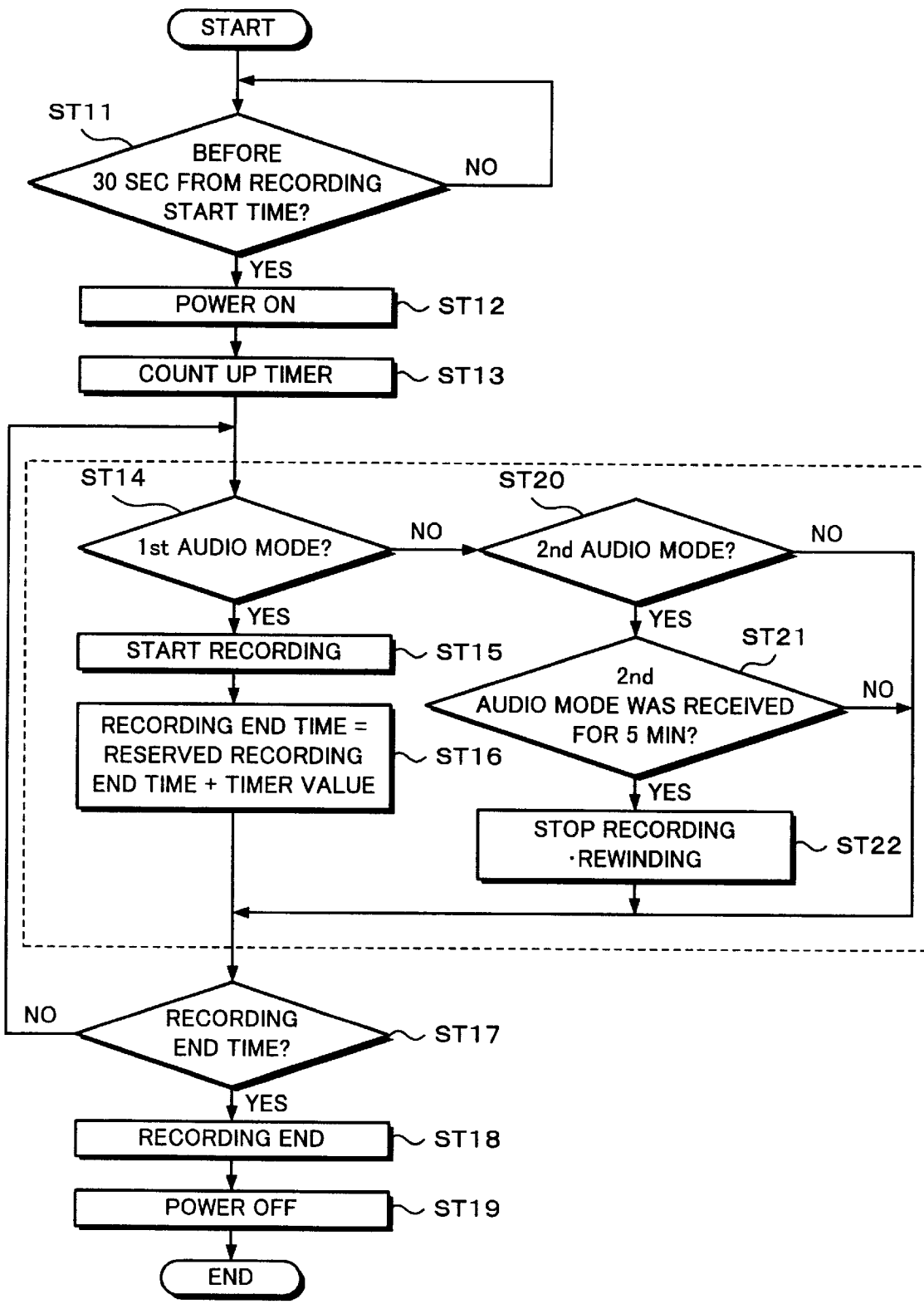
FIG. 6 is a flowchart for explaining processes at the time of the timer recording of the VTR according to the embodiment of the invention.

FIG. 6 will now be described with respect to a specific example.

When the present time approaches the recording start time, it is determined in step ST11 that the present time is 30 seconds before the recording start time. The power source is turned on in step ST12 and the apparatus is set into the standby state. When the reserved program is, for example, the double audio broadcasting and its audio mode has been set to the double audio mode and the signal in the double audio mode is received as scheduled, it is determined that the audio mode of the reception signal and the set audio mode coincide in step ST14. The recording is started in step ST15. When the recording end time comes, it is decided in step ST17 that the present time is the recording end time. The recording is finished in step ST18.

If the reserved program is delayed and the previous program is the monaural broadcasting, it is determined in step ST14 that the audio mode of the reception signal is different from the set audio mode, so that the apparatus is held in the standby state. When the reserved program is started and the signal in the double audio mode is received, it is determined in step ST14 that the audio mode of the reception signal coincides with the set audio mode, so that the recording is started in step ST15. The elapsed time is counted in step ST13 in the standby state. In step ST16, the count value of the elapsed time is added to the set recording end time and the recording end time is updated. When it is decided in step ST17 that the updated recording end time has come, the recording is finished in step ST18.

When the audio mode of the program P1 whose recording is reserved and that of the previous program P0 are different, although the recording time is updated as mentioned above, there is also a case where the audio modes of both of the programs P1 and P0 are the same. In steps ST20 and ST21, a check is made to see if the signal in the second audio mode has been received. When the signal in the second audio mode is received for five or more minutes, the recording is stopped and the video tape is rewound, thereby coping with the case of the same audio mode. For example, even in the case where both of the recording reservation program P1 and the previous program P0 are in the double audio mode (or monaural audio mode), a commercial in the stereophonic audio mode is broadcasted for a predetermined time between the previous program P0 and the recording reservation program P1. A stereophonic broadcasting such as a commercial or the like between the programs is used.

In FIG. 6, when the audio modes of the previous program P0 and the recording reservation program P1 are the same, even if the recording reservation program P1 was delayed and the previous program P0 was being broadcasted at the time point of the set recording start time, it is determined that the audio mode of the reception signal and the set audio mode coincide, and the recording is once started (step ST14 to step ST17). After the previous program P0 was finished, at the time point when the stereophonic broadcasting such as a commercial or the like has been started before the program P1 to be recorded is started, it is determined in step ST14 that the audio mode of the reception signal is different from the set audio mode. A check is made in step ST20 to see if the reception signal is the signal in the second audio mode.

When the commercial is received, since the audio mode of the reception signal is the stereophonic audio mode, it is determined in step ST20 that the signal in the second audio mode different from the set audio mode has been received. In step ST21, a check is made to see if the signal in the second audio mode, namely, in the stereophonic audio mode has been received for five minutes. When the signal in the second audio mode is received for five minutes, in step ST22, the recording is stopped, the video tape is rewound to the original recording start position, and the recording so far is cancelled. When the commercial is finished and the rewinding is finished, the recording is again started.

Figure 8:
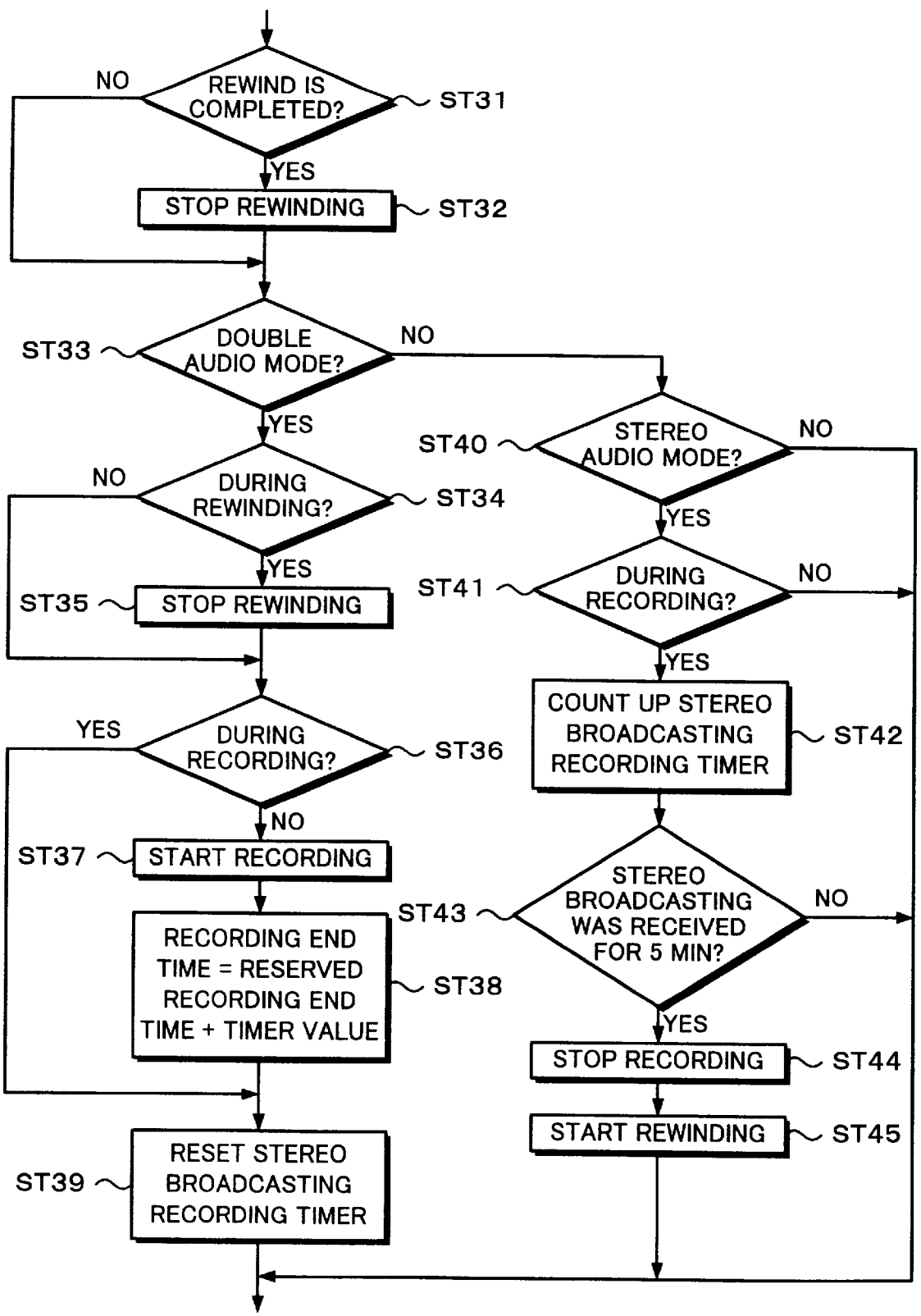
FIG. 8 is a flowchart for explaining processes in the case where an audio mode of a program whose recording is reserved is the double audio mode.
Figure 10:
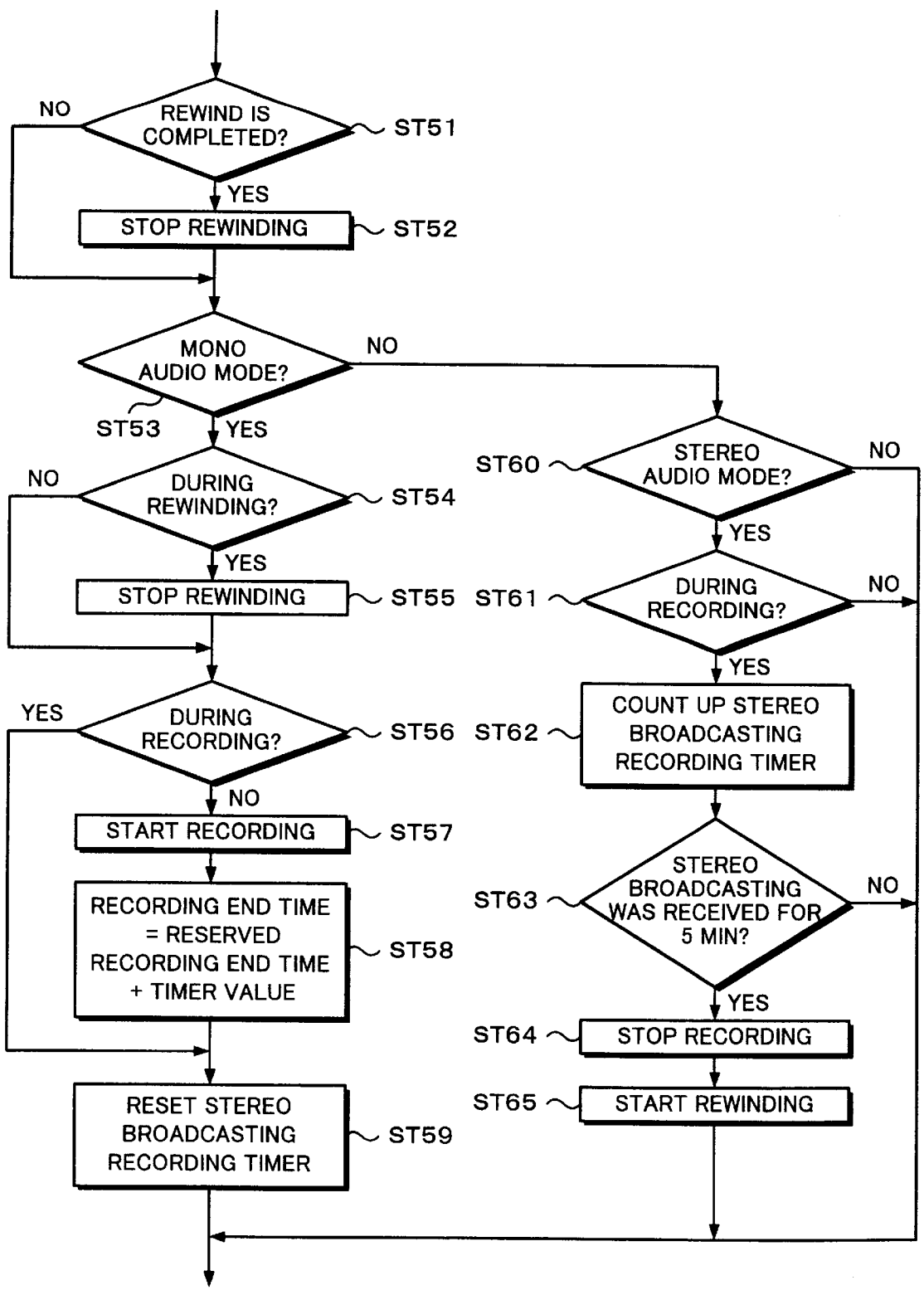
FIG. 10 is a flowchart for explaining processes in the case where the audio mode of a program whose recording is reserved is the monaural audio mode.
Figure 12:
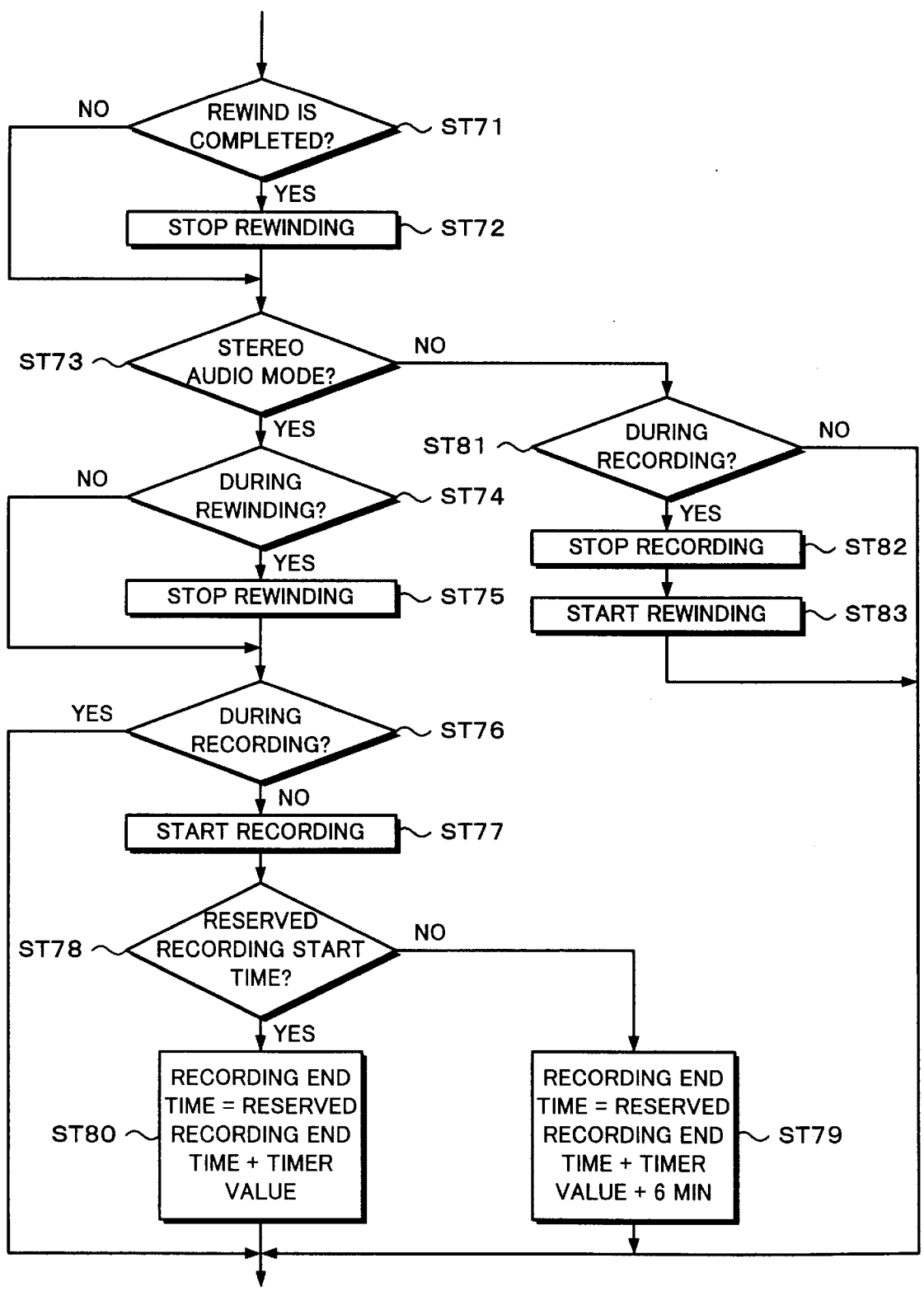
FIG. 12 is a flowchart for explaining processes in the case where the audio mode of a program whose recording is reserved is the stereophonic audio mode.

Although the case of recording the program in the double audio mode has been described above as an example, when the audio mode of the program whose recording is reserved is the double audio mode, monaural audio mode, or stereophonic audio mode, the respective processes shown in a region surrounded by a broken line in FIG. 6 are executed as shown in FIGS. 8, 10, and 12.

Figure 7:
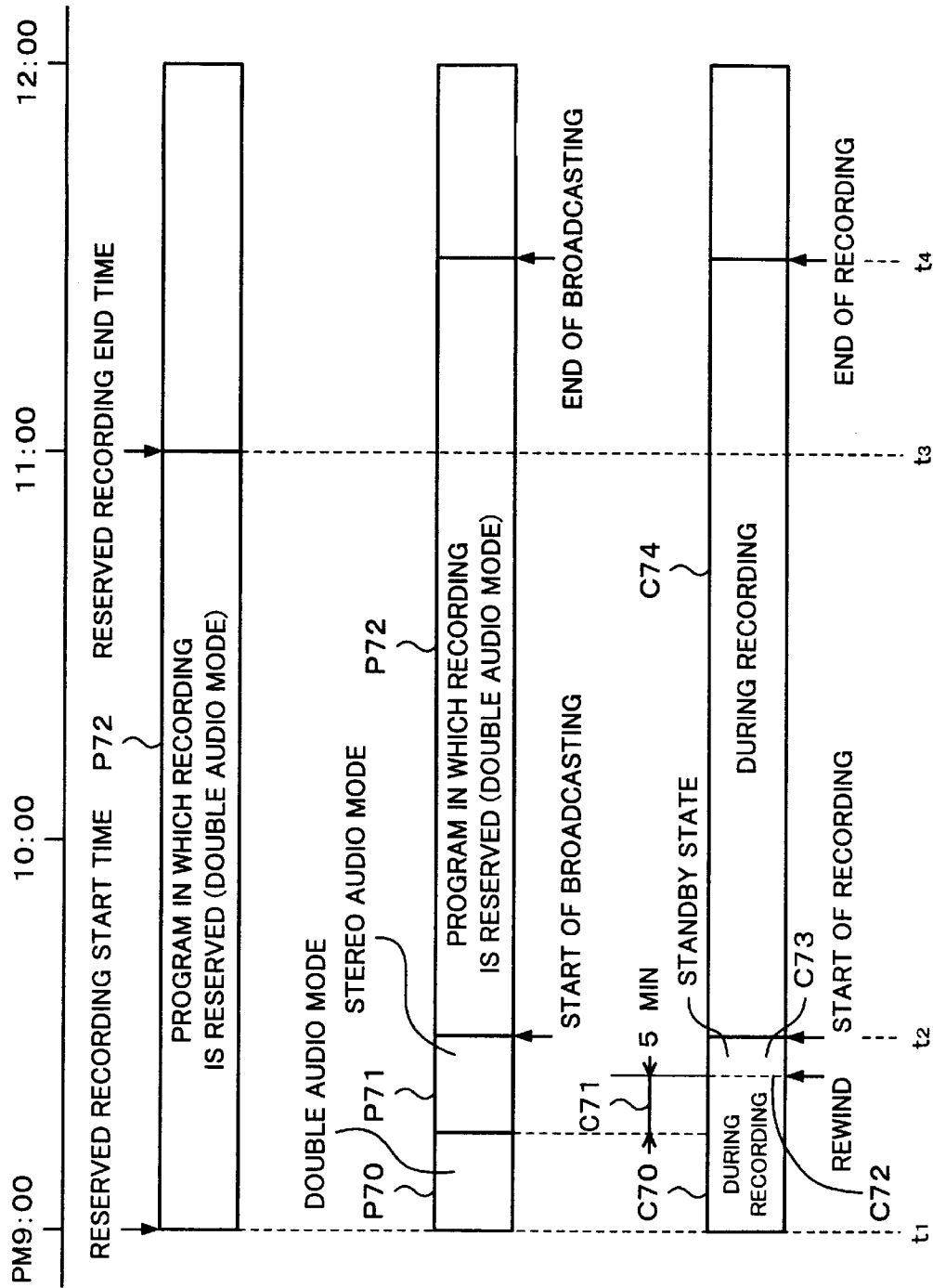
FIG. 7A is a time chart showing a scheduled broadcasting time of a program in a double audio mode in which the timer recording is reserved in the VTR according to the embodiment of the invention.
FIG. 7B is a time chart showing a broadcasting time in the case where a program in the double audio mode in which the timer recording is reserved in the VTR according to the embodiment of the invention is extended.
FIG. 7C is a time chart for explaining the operation at the time of the timer recording of the program in the double audio mode of the VTR according to the embodiment of the invention.

FIGS. 7A to 8 show the processes in the case where the audio mode of the program whose recording is reserved is the double audio mode (program P72) as shown in FIG. 7A and the previous program P70 in the same double audio mode is extended and a commercial P71 in the stereophonic mode is inserted between the recording reservation program P72 and the previous program P70 as shown in FIG. 7B.

A check is made to see if the rewinding operation has been finished (step ST31). If the video tape has been rewound up to a predetermined value, the rewinding operation is stopped (step ST32). If NO, the processing routine advances to step ST33 in the rewinding state.

A check is made to see if the audio mode of the reception signal is the double audio mode (step ST33). When the audio mode of the reception signal is the double audio mode, a check is made to see if the video tape is being rewound (step ST34). If NO, a check is made to see if the recording operation is being performed (step ST36). If the video tape is being rewound, the rewinding operation is stopped (step ST35). A check is made to see if the recording operation is being executed (step ST36). The reason why the rewinding operation is stopped even during the rewinding operation is to enable the program whose recording is reserved to be certainly recorded from the head when the program whose recording is reserved is started during the rewinding operation.

If the recording operation is not being performed in step ST36, the recording is started (step ST37), the recording end time is updated (step ST39), and a stereophonic broadcasting recording timer is reset (step ST39). As shown in FIG. 7C, the previous program (P70) is recorded (C70). If the recording operation is being performed in step ST36, the stereophonic broadcasting recording timer is reset (step ST39). The processing routine advances to step ST17 in FIG. 6.

In step ST33, when it is determined that the audio mode of the reception signal is not the double audio mode, a check is made to see if the audio mode of the reception signal is the stereophonic audio mode (step ST40). In case of the stereophonic audio mode, a check is made to see if the recording operation is being performed (step ST41). When the recording operation is not being performed, the processing routine advances to step ST17 in FIG. 6. If the recording operation is being executed, the stereophonic broadcasting recording timer is counted. When a commercial P71 in the stereophonic audio mode in FIG. 7B is received, the stereophonic broadcasting recording timer is counted in C71 as shown in FIG. 7C. A check is made to see if the stereophonic broadcasting has been received for five minutes (step ST43).

When the stereophonic broadcasting is received for five minutes, the recording is stopped (step ST44) and the rewinding operation is started (step ST45). The processing routine advances to step ST17 in FIG. 6. Since the commercial P71 in FIG. 7B is received for five minutes in C71 as shown in FIG. 7C, the video tape is rewound in C72 and the apparatus enters a recording standby state in C73. When a recording reservation program P72 in the double audio mode is received, the recording is restarted (step ST37) (C74). In step ST38, the recording end time is again updated. When the stereophonic broadcasting is not received for five minutes in step ST43, the processing routine advances to step ST17 in FIG. 6.

Figure 9:
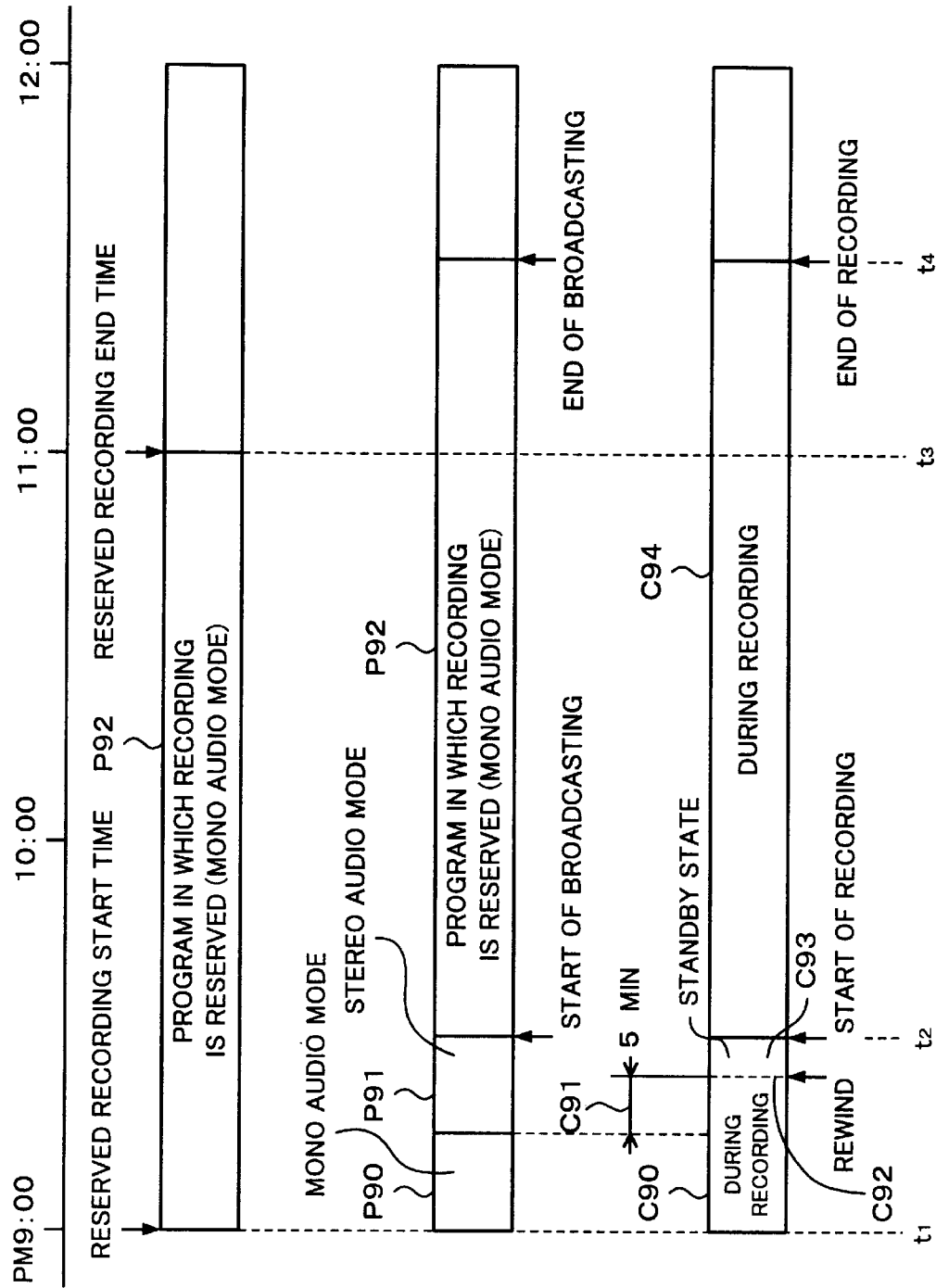
FIG. 9A is a time chart showing a scheduled broadcasting time of a program in a monaural audio mode in which the timer recording is reserved in the VTR according to the embodiment of the invention.
FIG. 9B is a time chart showing a broadcasting time in the case where the program in the monaural audio mode in which the timer recording is reserved in the VTR according to the embodiment of the invention is extended.
FIG. 9C is a time chart for explaining the operation at the time of the timer recording of the program in the monaural audio mode of the VTR according to the embodiment of the invention.

FIGS. 9 and 10 show processes in the case where the audio mode of the program whose recording is reserved is the monaural audio mode (program P92) as shown in FIG. 9A and the previous program P90 in the same monaural audio mode is extended and a commercial P91 in the stereophonic audio mode is inserted between the recording reservation program P92 and the previous program P90 as shown in FIG. 9B.

A check is made to see if the rewinding operation has been completed (step ST51). If the video tape has been completely rewound up to a predetermined value, the rewinding operation is stopped (step ST52). If the rewinding operation is not yet completed, the processing routine advances to step ST53 in the rewinding state. A check is made to see if the audio mode of the reception signal is the monaural audio mode (step ST53). When the audio mode of the reception signal is the monaural audio mode, a check is made to see if the video tape is at present being rewound (step ST54). When the video tape is not being rewound, a check is made to see if the recording operation is being performed (step ST56). If the video tape is being rewound, the rewinding operation is stopped (step ST55). A check is made to see if the recording operation is being performed (step ST56).

When the recording operation is not being performed in step ST56, the recording is started (step ST57). The recording end time is updated (step ST58). The stereophonic broadcasting recording timer is reset (step ST59). As shown in FIG. 9C, the previous program P90 is recorded (C90).

When the recording operation is being performed in step ST56, the stereophonic broadcasting recording timer is reset (step ST59). When the stereophonic broadcasting recording timer is reset, the processing routine advances to step ST17 in FIG. 6.

When it is decided in step ST53 that the audio mode of the reception signal is not the monaural audio mode, a check is made to see if the audio mode of the reception signal is the stereophonic audio mode (step ST60). When it is the stereophonic audio mode, a check is made to see if the recording operation is being performed (step ST61). If YES, the stereophonic broadcasting recording timer is counted up (step ST62). When the commercial P91 in the stereophonic audio mode in FIG. 9B is received, the stereophonic broadcasting recording timer is counted in C91 as shown in FIG. 9C. A check is made to see if the stereophonic broadcasting has been received for five minutes (step ST63). When the stereophonic broadcasting is received for five minutes, the recording is stopped (step ST64) and the rewinding operation is started (step ST65). The processing routine advances to step ST17 in FIG. 6. Since the commercial P91 in FIG. 9B is received for five minutes in C91 as shown in FIG. 9C, the video tape is rewound in C92 and the apparatus enters the recording standby state in C93. When a recording reservation program P92 in the monaural audio mode is received, the recording is restarted (step ST57) (C94). The recording end time is again updated in step ST58.

When the stereophonic broadcasting is not received for five minutes in step ST63, the processing routine advances to step ST17 in FIG. 6.

Figure 11:
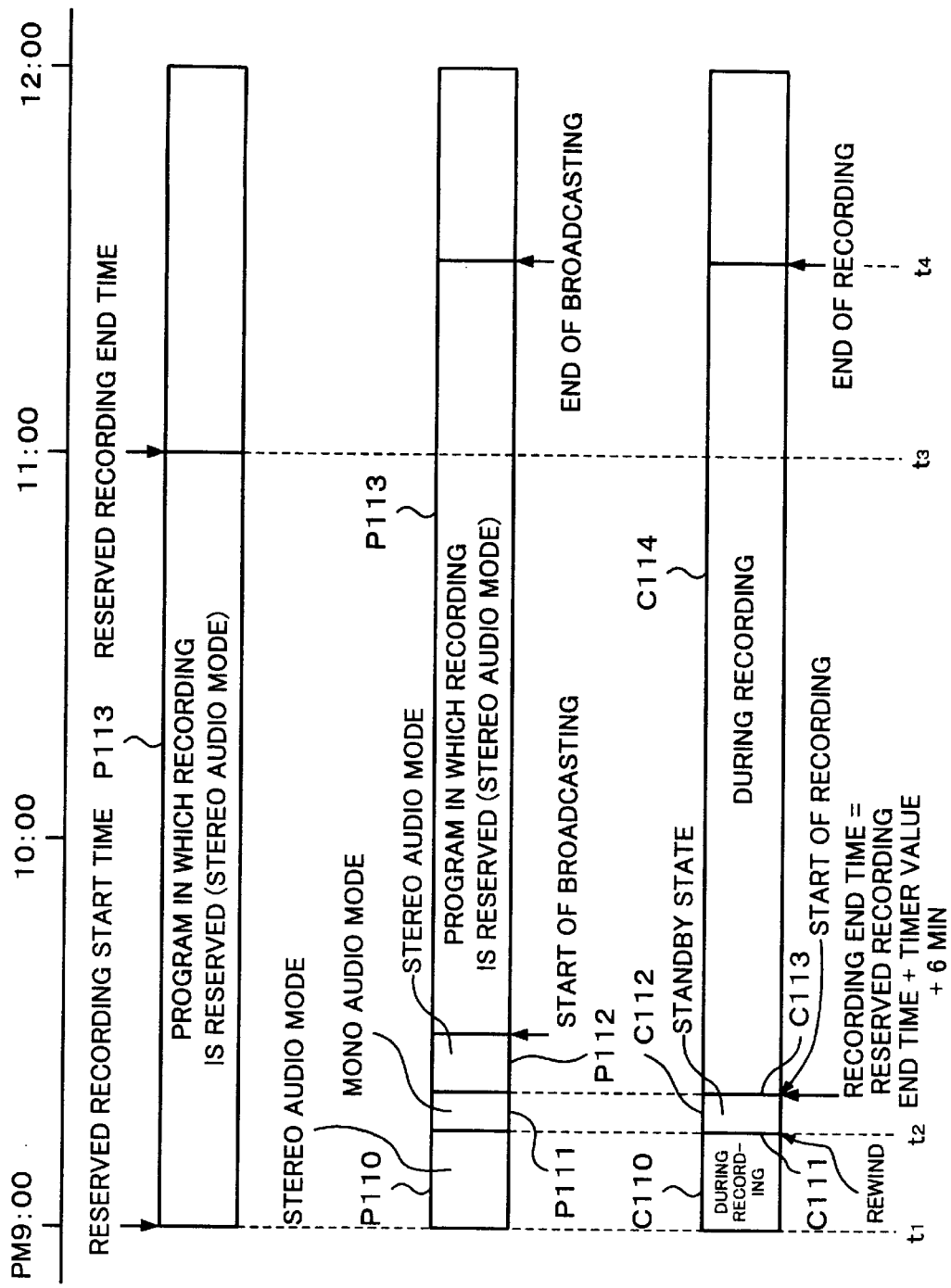
FIG. 11A is a time chart showing a scheduled broadcasting time of a program in a stereophonic audio mode in which the timer recording is reserved in the VTR according to the embodiment of the invention.
FIG. 11B is a time chart showing a broadcasting time in the case where the program in the stereophonic audio mode in which the timer recording is reserved in the VTR according to the embodiment of the invention is extended.
FIG. 11C is a time chart for explaining the operation at the time of the timer recording of the program in the stereophonic audio mode of the VTR according to the embodiment of the invention.

FIGS. 11A to 12 show processes in the case where the audio mode of the program whose recording is reserved is the stereophonic audio mode (program P113) as shown in FIG. 11A and the previous program P110 in the same stereophonic audio mode is extended and a news program P111 of about two minutes in the monaural audio mode and, for example, a commercial P112 of six minutes after the news program P111 are inserted between the recording reservation program P112 and the previous program P110 as shown in FIG. 11B.

A check is made to see if the rewinding operation has been completed (step ST71). If the video tape has been completely rewound up to a predetermined value, the rewinding operation is stopped (step ST72). If the rewinding operation is not yet completed, the processing routine advances to step ST73 in the rewinding state. A check is made to see if the audio mode of the reception signal is the stereophonic audio mode (step ST73). When the audio mode of the reception signal is the stereophonic audio mode, a check is made to see if the video tape is at present being rewound (step ST74). When the video tape is not being rewound, a check is made to see if the recording operation is being performed (step ST76). If the video tape is being rewound, the rewinding operation is stopped (step ST75). A check is made to see if the recording operation is being performed (step ST76).

When the recording operation is not being performed in step ST76, the recording is started (step ST77). A check is made to see if the reserved recording start time has come (step ST78). If the present time is not the reserved recording start time, a time of six minutes is added to the recording end time which is updated in step of ordinary updating of recording end time (see step ST80). Thus, the recording end time is updated (step ST79). If the present time is the reserved recording start time, the recording end time is updated (step ST80). As shown in FIG. 11B, since the audio mode of the previous program P110 is the stereophonic audio mode and the present time is the reserved recording start time, the recording is started (C110) as shown in FIG. 11C. The processing routine advances to step ST17 in FIG. 6.

When it is decided in step ST73 that the audio mode of the reception signal is not the stereophonic audio mode, a check is made to see if the recording operation is being performed (step ST81). When the recording operation is not being performed, the processing routine advances to step ST17 in FIG. 6. When the recording operation is being performed, the recording is stopped (step ST82) and the rewinding operation is started (step ST83). When the news program P111 in the monaural audio mode in FIG. 11B is received, as shown in FIG. 11C, the recording is stopped and the video tape is rewound (C111). The apparatus is set into the recording standby state (C112). The processing routine advances to step ST17 in FIG. 6.

When the stereophonic broadcasting is recorded, since the commercial is a stereophonic broadcasting, in the case where the previous program is the stereophonic broadcasting and the reserved program is the stereophonic broadcasting, it is difficult to simply discriminate the extension by using the stereophonic broadcasting of the commercial. If a monaural broadcasting, such as a news program or the like, has been inserted between the previous program and the recording reservation program, there can be a situation wherein it is decided that the program was extended.

When the news program P111 in the monaural audio mode in FIG. 11B is finished and the commercial P112 in the stereophonic audio mode is again received, the recording is restarted in step ST77. However, for example, now assuming that there is a time interval of six minutes until the extended program is started after the end of the news program, the time of last six minutes of the extended program is not recorded in case of the ordinary updating of the recording end time (step ST80). Therefore, when the present time is not the reserved recording start time in step ST78, the time of six minutes is added to the ordinary recording end time (step ST79) (C113) and the recording is executed (C114).

In FIG. 11C, although the recording start time is earlier by six minutes, the recording start time can also be updated in step ST79 in a manner similar to the case of updating the recording end time.

According to the VTR of the embodiment with the above construction, at the time of the timer recording, even in the case where the broadcasting time (broadcasting start time and broadcasting end time) of the program P1 whose recording is reserved is deviated back because of an extension of the broadcasting of the program P0 before the recording reservation program P1 or the like, the audio mode of the recording reservation program P1 is previously selected. Thus, while the previous program P0 is being broadcasted, the recording is not started but is held in the standby state. The recording can be started simultaneously with the start of the broadcasting of the recording reservation program P1. A difference between the reserved recording start time as a reference and the time when the recording is actually started is counted, the difference is added to the reserved recording end time, and the reserved recording end time can be automatically updated.

According to the VTR of the invention, therefore, even if the broadcasting time of the recording reservation program P1 is changed due to the extension of the broadcasting of the previous program P0 or the like, the recording reservation program P1 can be recorded from the beginning to the end thereof without dropping out any video image. The user can perform the timer recording of the recording reservation program P1 without worrying about the extension of the previous program P0. Since a vain operation such that the previous program P0 is recorded in the head portion of the recording is eliminated, the video tape is saved. In the case where only the program P1 whose recording is reserved has been recorded on a specific video tape every week, an original tape of the recording reservation program P1 is formed.

Although the embodiment of the invention has specifically been described above, the invention is not limited to the foregoing embodiment but many modifications and variations are possible within the spirit and scope of the appended claims of the invention.

In the above embodiment, it is also possible to construct in a manner such so when the reserved recording end time is updated, the count value of the timer in which the counting operation was started at the recording start time is checked and when the count value lies within five minutes, it is recognized that the recording reservation program was broadcasted at the initial reserved broadcasting start time and the recording end time is not updated. It is also possible to construct in a manner so that the extension time of the recording start time is set to, for instance, up to three hours and if the broadcasting of the recording reservation program is not started until the elapse of three hours, the recording is not performed. In this case, until the recording is started, for example, a message such as "PROGRAM IS DELAYED" or the like can be also displayed.

In the above embodiment, it is also possible to construct in a manner so that the processes (for example, step ST22 in the flowchart of FIG. 6, step ST65 in the flowchart of FIG. 10, etc.) regarding the rewinding of the video tape are not executed.

In the above embodiment, at the time of the timer recording, the recording is started at a time point when the program whose recording is reserved is almost started. However, the recording can be also started irrespective of a discrimination result about whether the recording reservation program is broadcasted at the reserved recording start time or not. A time which is required from the recording start time as a reference until the recording reservation program is started is calculated, the calculated time is added to the reserved recording end time, and the recording end time is updated.

What is claimed is:

1. A recording apparatus comprising:
    input setting means in which a recording start time and a recording end time are set and an audio mode of a signal of a program whose recording is reserved is set;
    recording means for recording an input signal which is received from a source side to a recording medium;
    audio mode detecting means for detecting an audio mode of said received input signal;
    counting means for counting a time while setting said recording start time to a reference; and
    recording time updating means for adding a predetermined value to said recording end time in accordance with the time counted by said counting means.

2. An apparatus according to claim 1, wherein said recording time is updated in accordance with a time which is required until the audio mode that is detected by said audio mode detecting means is switched to the audio mode that is set by said input setting means.

3. An apparatus according to claim 1, further having means for counting a time when an audio mode different from the audio mode which is set by said input setting means is detected by said audio mode detecting means and for interrupting the recording operation by said recording means when the audio mode different from the audio mode which is set by said input setting means is detected for a predetermined time or more.

4. An apparatus according to claim 1, wherein said recording time updating means adds said predetermined value to said recording start time.

5. An apparatus according to claim 3, wherein when the audio mode different from the audio mode which is set by said input setting means is detected for said predetermined time or more and said input signal which is received from said source side is written to said recording medium by said recording means, said apparatus is controlled so that the recording operation of said recording means is interrupted and the signal is again recorded from the head of said recording medium.

6. An apparatus according to claim 1, wherein said audio mode is a plural audio mode or a single audio mode.

7. An apparatus according to claim 6, wherein said plural audio mode is a stereophonic audio mode.

8. An apparatus according to claim 7, wherein said stereophonic audio mode is based on a single language or a plurality of languages.

9. A recording system comprising:
    operating means for designating a recording start time and a recording end time and designating an audio signal mode of a signal of a program whose recording is reserved;
    recording means for recording an input signal which is received from a source side to a recording medium;
    audio mode detecting means for detecting an audio mode of said received input signal;
    counting means for counting a time while setting said recording start time to a reference; and
    recording time updating means for adding a predetermined value to said recording end time in accordance with the time counted by said counting means.

10. A system according to claim 9, wherein said recording time is updated in accordance with a time which is required until the audio mode that is detected by said audio mode detecting means is switched to the audio mode that is designated by said operating means.

11. A system according to claim 9, further having means for counting a time when an audio mode different from the audio mode which is designated by said operating means is detected by said audio mode detecting means and for interrupting the recording operation by said recording means when the audio mode different from the audio mode which is designated by said operating means is detected for a predetermined time or more.

12. A system according to claim 9, wherein said recording time updating means adds said predetermined value to said recording start time.

13. A system according to claim 11, wherein when the audio mode different from the audio mode which is designated by said operating means is detected for said predetermined time or more and said input signal which is received from said source side is written to said recording medium by said recording means, said system is controlled so that the recording operation of said recording means is interrupted and the signal is again recorded from the head of said recording medium.

14. A system according to claim 9, wherein said audio mode is a plural audio mode or a single audio mode.

15. A system according to claim 14, wherein said plural audio mode is a stereophonic audio mode.

16. A system according to claim 15, wherein said stereophonic audio mode is based on a single language or a plurality of languages.

17. A recording method comprising:
    a recording reserving step of designating a recording start time and a recording end time and designating an audio mode of a signal of a program whose recording is reserved;
    a counting step of counting a time while setting said recording start time to a reference;
    an audio mode discriminating step of discriminating whether an audio mode of a signal of a program which is received is a first audio mode as an audio mode of said program whose recording is reserved or not;
    a recording starting step of starting a recording of the program which is received to a recording medium when it is determined in said audio mode discriminating step that the audio mode of said received program is the first audio mode; and
    a recording time updating step of adding a predetermined value to said recording end time in accordance with the time counted by said counting step when said recording is started.

18. A method according to claim 17, wherein said recording time is updated in said recording time updating step in accordance with a time which is required until the audio mode that is detected by said audio mode discriminating step is switched to said first audio mode.

19. A method according to claim 17, further having a step of counting a time when an audio mode different from said first audio mode is detected by said audio mode discriminating step and interrupting the recording operation of said program to said recording medium when the audio mode different from said first audio mode is detected by said audio mode discriminating step is detected for a predetermined time or more.

20. A method according to claim 17, wherein in said recording time updating step, said predetermined value is added to said recording start time.

21. A method according to claim 19, further having a step which is controlled in a manner such that when the audio mode different from said first audio mode is detected for said predetermined time or more and said program which is received is written to said recording medium, the recording operation to said recording medium is interrupted and the signal is again recorded from the head of said recording medium.

22. A method according to claim 17, wherein said audio mode is a plural audio mode or a single audio mode.

23. A method according to claim 22, wherein said plural audio mode is a stereophonic audio mode.

24. A method according to claim 23, wherein said stereophonic audio mode is based on a single language or a plurality of languages.

* * * * *